United States Patent
Pedersen et al.

(10) Patent No.: US 10,000,963 B2
(45) Date of Patent: Jun. 19, 2018

(54) TWO PART SPACER WITH OVERLAPPING SURFACES

(71) Applicant: ROLLTECH A/S, Hjørring (DK)

(72) Inventors: Peter Barkholt Pedersen, Hjørring (DK); Lars Hegelund Knudsen, Aalborg (DK)

(73) Assignee: Rolltech A/S, Hjorring (DK)

( * ) Notice: Subject to any disclaimer, the term of this patent is extended or adjusted under 35 U.S.C. 154(b) by 278 days.

(21) Appl. No.: 14/605,362

(22) Filed: Jan. 26, 2015

(65) Prior Publication Data
US 2016/0215556 A1    Jul. 28, 2016

(51) Int. Cl.
*E06B 3/663* (2006.01)
*E06B 3/673* (2006.01)

(52) U.S. Cl.
CPC ...... *E06B 3/66304* (2013.01); *E06B 3/66309* (2013.01); *E06B 3/66328* (2013.01); *E06B 3/67308* (2013.01); *E06B 3/66323* (2013.01); *E06B 2003/66395* (2013.01)

(58) Field of Classification Search
CPC ............. E06B 3/66304; E06B 3/66309; E06B 3/66323; E06B 3/66328; B29C 65/7814; B29C 66/124; B29C 66/742; B29C 66/30325; B23K 31/02
See application file for complete search history.

(56) References Cited

U.S. PATENT DOCUMENTS

| | | | | |
|---|---|---|---|---|
| 2,049,184 A | * | 7/1936 | Walsleben | H02G 3/0487 138/106 |
| 4,850,175 A | * | 7/1989 | Berdan | E06B 3/6604 428/34 |
| 5,094,055 A | | 3/1992 | Berdan | |
| 5,630,306 A | | 5/1997 | Wylie | |
| 5,714,214 A | | 2/1998 | Larsen | |

FOREIGN PATENT DOCUMENTS

| | | |
|---|---|---|
| DE | G9214799.2 | 10/1992 |
| DE | G9318934.6 | 12/1993 |
| EP | 0852280 A1 | 7/1998 |
| EP | 0947659 A2 | 10/1999 |
| EP | 1022424 A2 | 7/2000 |
| EP | 1233136 A1 | 8/2002 |
| EP | 1889995 A1 | 2/2008 |
| WO | 1999015753 A1 | 4/1999 |
| WO | 9942693 | 8/1999 |
| WO | 1999041481 A1 | 8/1999 |
| WO | 0188319 A1 | 11/2001 |
| WO | 03074830 A1 | 9/2003 |

\* cited by examiner

*Primary Examiner* — Donald J Loney
(74) *Attorney, Agent, or Firm* — Mollborn Patents Inc.; Fredrik Mollborn

(57) ABSTRACT

The present invention relates to a spacer 101 for forming a spacing between glass panes 201, 203, with a top part 103 and a lower metal foil 105, the two parts introduces an overlap 209, 211 parallel to the sidewalls of the spacer. By having overlapping regions at the side walls the spacer is stiffened and thereby spacers can be produced of quite thin material e.g. only thin metal foil.

7 Claims, 3 Drawing Sheets

TWO PART SPACER WITH OVERLAPPING SURFACES

FIELD OF THE INVENTION

The present invention relates to a spacer for forming a spacing between glass panes. The spacer comprises a top part and a lower metal foil, wherein said top part has an inner wall part with overlap surfaces at each end for connecting to said metal foil, and wherein said metal foil has an outer wall part and two lateral sidewalls extending from said outer wall part, and towards said top part. The present invention further relates to a method of manufacturing a spacer and a window comprising glass panes being mutually spaced by a spacer.

BACKGROUND OF THE INVENTION

It is well known to provide spacers in order to define the spacing between the panes of isolating glazings consisting of a plurality of parallel glass panes spaced by an isolating cavity.

A plurality of such spacers made of different materials and of different shapes is known in the art. Spacers made by roll forming of a metal foil are widely used in the art and considered to be one of the preferred alternatives because of their stability and their low gas diffusion properties.

Insulating Glass Units (IG units) having a plurality of glass panes are made by automatic manufacturing machines. Spacers are automatically bent to the desired size and shape and are arranged between two neighbouring glass panes. Spacers made of metal foils can be easily bent and will remain in the bent position.

Furthermore, spacers made of metal foils have a high resistance against diffusion of gases and moisture penetration. Within the space between the neighbouring glass panes, there is arranged a gas, for instance argon having good isolating properties. In order to avoid any loss of gas, the spacers delimiting the cavity need to be resistant against diffusion of such gaseous elements.

However, known spacers which are exclusively made of metal such as aluminium and galvanized steel have also some disadvantages. Due to a relatively high heat conductivity of metal, spacers made of a metal foil still have a heat conductivity which under certain circumstances may be too high.

In order to further reduce the heat conductivity, it has been suggested to use plastic material for forming such spacers. Plastic material has, however, relatively high gas diffusion as compared to metal. It thus has been suggested to provide a metal foil over a plastic body. Such a spacer is e.g. shown in EP 852 280.

A further problem of spacers made of plastic material is their instability during the manufacturing process. In particular, a spacer bent to the desired frame shape may be slightly deformed during assembly because of the resiliency of plastic material. Misalignments of the spacer during manufacturing thus are possible. In order to avoid this problem, it has been suggested to use glass fibre reinforced plastic material in EP 852 280. Furthermore, plastics spacers including stabilising material in a plastic body have been proposed e.g. in WO 99/15753 or in WO 99/41481. However, these solutions have also some disadvantages. In particular, manufacturing is relatively complicated.

Similar spacers made from a body of plastic material are further known from DE 9 214 799, EP 1 022 424, EP 947 659 A2, EP 1 233 136 A1, WO 99/42693 or WO 03/074830. In U.S. Pat. No. 5,630,306 there is disclosed an insulating spacer which comprises a main body formed of a plastic material. Metallic leg members are attached to the plastic main body. While the problem of heat conduction and diffusion can be addressed with such spacer, some problems remain in context with bending the spacer into the desired frame shape and later during assembly of an IG Unit. In particular, the lateral legs may be deformed during bending out of their plane so that an irregular shape may result. Such an irregular shape is particularly disadvantageous if a sealing contact between the spacer and a glass pane shall be achieved.

Another way of making spacers with a low heat conductivity could be by making the spacers from thin materials, thereby the amount of material is reduced but this also results in a soft and flexible spacer being difficult to handle while mounting between panes.

U.S. Pat. No. 5,714,214 describes a spacer which minimises both gas diffusion and heat diffusion by combining two spacer parts from material having different properties. In U.S. Pat. No. 5,714,214, two spacer parts are connected at the top with welding points positioned at the top between two folded overlaps. This is a complex solution to manufacture, both because it is a complex task to combine the two spacer parts and obtain the side overlaps, also because a welding means has to access the space between the two overlap parts for welding the welding points, and finally the subsequent bending of the spacer into a desired frame shape will deform the spacer in a manner which may weaken the weldings.

SUMMARY

The various embodiments of the invention provide a spacer with an increased stiffness compared to conventional spacers. In accordance with the various embodiments, a spacer for forming a spacing between glass panes is provided, with a top part and a lower metal foil, wherein said top part has an inner wall part with overlap surfaces at each end for connecting to said metal foil, and wherein said metal foil has an outer wall part and two lateral sidewalls extending from said outer wall part, and towards said top part. Each end of said lateral side walls comprises an overlap surface parallel to each overlap surface of said top part, wherein the overlap surfaces are substantially parallel to the lateral sidewalls of said metal foil, wherein an end of an overlap surface overlapping another overlap surface is present at the outer surface on each side of said spacer, and wherein said overlap surfaces are mutually fastened in a region closer to the inner wall part than the outer wall part.

By having the ends of the overlaps at each side of the spacer, the two spacer parts can easily be combined to a spacer by bringing the spacer parts towards each other and further after combining the spacer parts, the overlaps can easily be accessed by welding means from each side of the spacer for welding. Further, by having the welding at each side, the fastening material for connecting the sides of the spacer to the panes for fastening the panes to the spacer also functions as a sealing means further sealing the welding.

Further by having overlapping regions at the side walls, the spacer is stiffened because of this overlap, thereby spacers can be produced of quite thin material e.g. where also the top part is made from a metal foil. The overlapping region at both side of the spacer ensures a stiffer spacer which can be handled easier. Further by fastening the overlapping surfaces close to the top part, when attaching the spacer between panes the used attachment material e.g. butyl ensures that the attachment is sealed. It is thereby ensured that gas from between the windows cannot pass the spacer through the connection between the top part and the lower metal foil. Further overlapping is present at both sides of the spacer and this also introduces a quite stiff spacer, even if the spacer is made from a thin material.

In an embodiment said top part further comprises a second overlap surface at each end, whereby said overlap surfaces at each end of said sidewalls of said metal foil are mutually fastened between said first and second overlap surface at each end of said inner wall part. Thereby a better fastening can be obtained between the two parts of the spacer, the metal foil overlap surfaces at the end of sidewalls are sandwiched between the first and second overlap surface at each end of the inner wall part.

In an embodiment the spacer further comprises overlap surfaces being substantially parallel to the inner wall part of said top part. Thereby the spacer is further strengthened.

In another embodiment the overlap surfaces are substantially parallel to the lateral sidewalls of said metal foil. Thereby the top part and metal foil are easy to assemble for specific assembling methods.

In an embodiment the top part is made of metal foil. Thereby the spacer becomes very resistant to gas diffusion.

In an embodiment the top part is made of a plastic material. Thereby heat conductivity is reduced.

In an embodiment said overlapping surfaces are mutually fastened by welding. This has been proven to be a very efficient way of fastening, where the overlap can be mutually fastened by spot welding from one side of the overlapping surfaces.

In an embodiment said overlapping surfaces are mutually fastened by gluing.

The invention further relates to a method of producing a spacer for forming a spacing between glass panes, comprising the steps of:

Providing an elongated top part having overlap surfaces at each end for connecting to a metal foil, Providing a metal foil with sidewalls having overlap surfaces, Attaching said metal foil and said top part to each other in such a way that the overlap surfaces at each end of the elongated top part and the overlap surfaces of the sidewalls of the metal foil are overlapping, and mutually fastening said overlap surfaces, wherein an end of an overlap surface overlapping another overlap surface is present at the outer surface on each side of said spacer.

The invention further relates to a window comprising glass panes being mutually spaced by a spacer according to the invention.

DESCRIPTION OF THE DRAWINGS

In the following embodiments of the present invention will be described referring to the figures, wherein.

DETAILED DESCRIPTION

Figure 1:
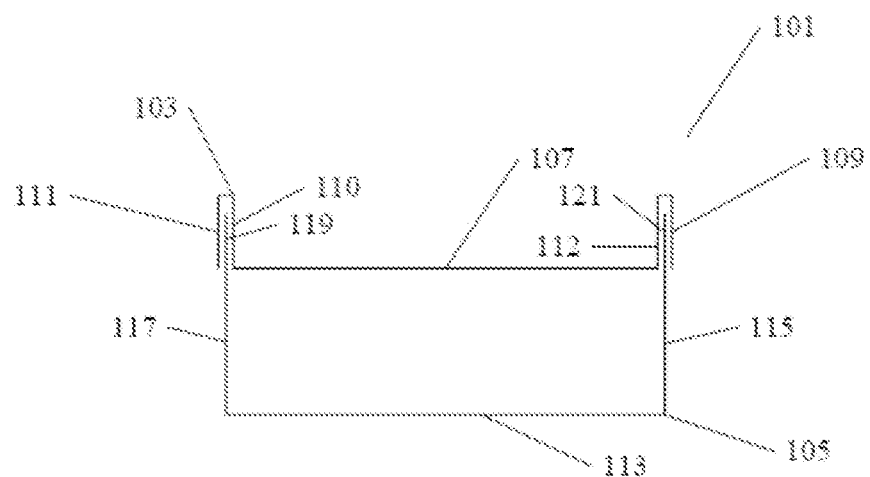
FIG. 1 illustrates a sectional view of an embodiment of a spacer according to the present invention.

FIG. 1 illustrates a sectional view of an embodiment of a spacer 101 for forming a spacing between panes according to the present invention. The spacer 101 comprises a top part 103 and a lower metal foil 105.

The top part 103 has an inner wall part 107 with corresponding overlap surfaces at each side being respectively 109, 112 and 110, 111 at each end for connecting to the lower metal foil 105. The top part can be in a thin material being either metal or plastic and could either be made by bending or extrusion. The material chosen influences both heat conductivity and the ability to resist gas diffusion.

The lower metal foil 105 has an outer wall part 113 and two lateral legs or sidewalls 115, 117 extending from the outer wall part 113 and towards the top part 103. Each end of said lateral side walls 115, 117 comprises an overlap surface 119 at one side and 121 at the other side being parallel to each overlap surface 109, 111 of the top part 103. The overlap surfaces of respectively the top part and the lower metal foil are substantially parallel to the lateral sidewalls 115, 117 of the metal foil 105 and thereby the side of the spacer ends up having layers of material at each side (in this example three layers) the layers in one side being 111, 119, 110 and in the other side being 112, 121, 109. By having these layers it is possible to make the spacers from quite thin materials e.g. metal foils and still obtain a stiff spacer, the stiffness caused by the overlapping.

As can be seen from the figure, the overlapping area are quite close to the inner wall and in the top part of the spacer and thereby the overlap surfaces can be mutually fastened in a region closer to the inner wall part than the outer wall part.

Figure 2:
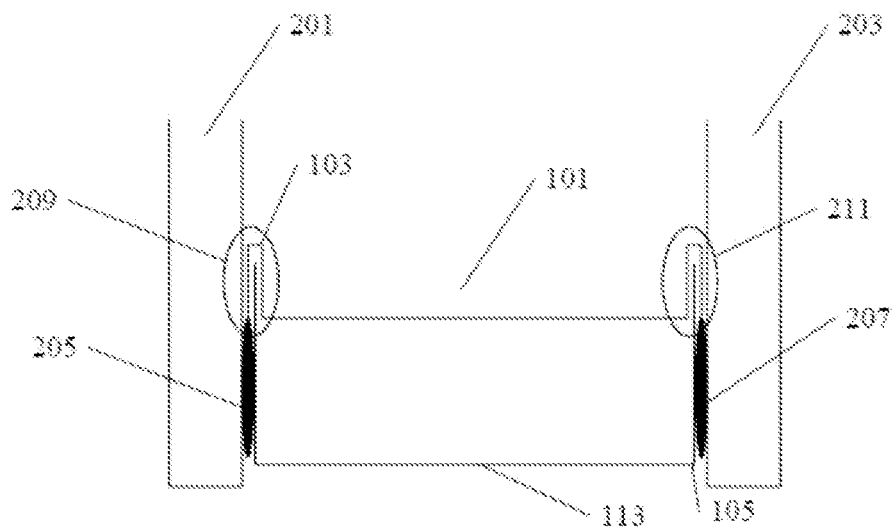
FIG. 2 illustrates a sectional view of the spacer of FIG. 1 mounted between panes.

In FIG. 2 a sectional view of the spacer 101 of FIG. 1 mounted between panes 201, 203 are illustrated. The spacer is mounted to the panes using a fastening material 205, 207 being e.g. butyl or another material being suitable for connecting the materials of respectively the sides of the spacer and the panes, further the fastening material should resist gas diffusion. The fastening material is below the overlapping area (encircled area 209, 211) where the two parts are fastened and thereby the only way gas can get from between the two panes 201, 203 and out is through the lower metal foil 113 or through the fastening material 205, 207.

Figure 3:
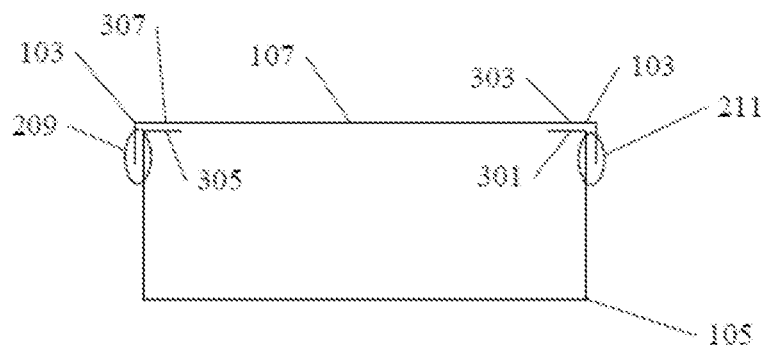
FIG. 3-5 illustrate a sectional view of alternative embodiments of the spacer according to the present invention.

In FIG. 3 an alternative embodiment where only two layers are overlapping parallel to the side walls (encircled areas 209, 211). In this embodiment further overlapping surfaces are present being substantially parallel with the inner wall of the top part. These further surfaces are illustrated by respectively 305 and 301 on the lower metal part 105 and 303 and 307 on the top part 103. Thereby the spacer is further strengthened.

Figure 4:

In FIG. 4 another embodiment is illustrated where two layers are overlapping parallel to the side walls (encircled areas 209, 211). In this embodiment the top part has been bended having peaks 401, 403. It is thereby possible to obtain a larger overlapping area at the top part of the spacer and thereby a better attachment of the two parts. Further the shaping of the spacer is optimised for influencing the bending properties of the spacer when bending to fit the geometry of the panes.

Figure 5:
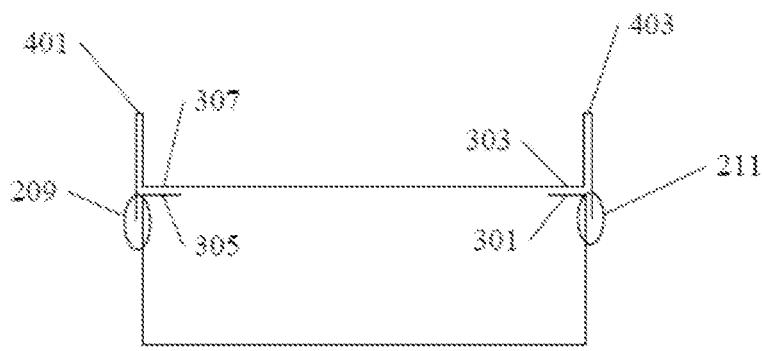

In FIG. 5 another embodiment of the spacer is illustrated where two layers are overlapping parallel to the side walls (encircled areas 209, 211). In this embodiment both peaks 401, 403 are3 present as well as a further overlapping being substantially parallel with the inner wall of the top part illustrated by respectively 305 and 301 on the lower metal part and 303 and 307 on the top part.

Figure 6A:
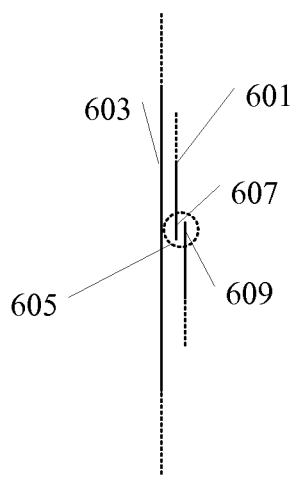
FIGS. 6a and 6b illustrate a zoom on the contact area between the pane and embodiments of spacers.
Figure 6B:
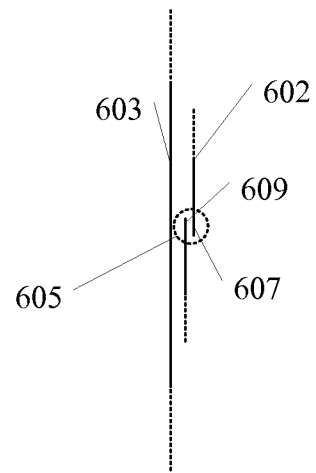

In FIGS. 6a and 6b, a zoom on the contact area between the pane 603 and embodiments of spacers 601, 602 are illustrated. The overlap area at the outer surface of the spacer and between the upper and lower part of the spacers 601, 602 is illustrated in the circled area 605. FIG. 6A illustrates a first embodiment, where the end 607 of the upper part is the outermost part, and the end 609 of the lower part is the innermost part being in contact with a surface of the pane 603 (embodiments of such overlap can e.g. be seen in FIGS. 1, 2, 3 and 5), and FIG. 6B illustrates a second embodiment, where the end of the lower part 609 is the outermost part being in contact with a surface of the pane (embodiments of such overlap can e.g. be seen in FIG. 4). In all embodiments, the end of an overlap surface is present at the outer surface on each side of the spacer.

The invention claimed is:

1. A spacer (101) configured to attach to a first glass pane (201) and a second glass pane (203), respectively, of an insulating glass unit to form a spacing between the first glass pane (201) and the second glass pane (203),
    wherein the spacer (101) comprises a top part (103) and a lower metal foil (105),
    wherein the top part (103) has an inner wall part (107) with overlap surfaces (111, 109) at each end for connecting to said metal foil (105),
    wherein the metal foil (105) has an outer wall part (113) and two lateral sidewalls (115, 117) extending from the outer wall part (113), and towards the top part (103),
    wherein each end of the lateral side walls (115, 117) comprises an overlap surface (119, 121) parallel to each overlap surface (109, 111) of the top part (103),
    wherein the overlap surfaces (111, 119, 109, 121) are substantially parallel to the lateral sidewalls (115, 117) of the metal foil (105),
    wherein an end of an overlap surface (111, 119, 109, 121) overlapping another overlap surface (111, 119, 109, 121) is present at the outer surface on each side of the spacer (101), and
    wherein the overlap surfaces (119, 111) are overlapping in an overlapping area (209, 211) in the top part of the spacer (101) for mutual fastening in a region closer to the inner wall part (107) than the outer wall part (113),
    wherein the sidewalls (115, 117) of the spacer (101) are further configured to be connected to the first panes (201) and the second pane (203), respectively by a fastening material (205, 207) positioned below the overlapping area (209, 211), and
    wherein the overlap surfaces (111, 119, 109, 121) in the overlap area (209, 211) are spot welded or glued to one another, from an outer side of the overlap surfaces (111, 119, 109, 121).

2. A spacer according to claim 1, wherein the top part (103) further comprises a second overlap surface (110, 112) at each end, whereby the overlap surfaces (119, 121) at each end of the sidewalls (115, 117) of the metal foil (105) are mutually fastened between the second overlap surface (110, 112) and the overlap surfaces (111, 109) at each end of the inner wall part (107).

3. A spacer according to claim 1, wherein the lower metal part (105) and the top part (103) of the spacer further each comprises overlap surfaces (301, 303, 305, 307) being substantially parallel to the inner wall part (107) of the top part (103).

4. A spacer according to claim 1, wherein the top part (103) is made of metal foil.

5. A spacer according to claim 1, wherein the top part (103) is made of a plastic material.

6. A method of producing a spacer (101) configured to attach to a first glass pane (201) and a second glass pane (203), respectively, of an insulating glass unit to form a spacing between the first glass pane (201) and the second glass pane (203), comprising the steps of:
    providing an elongated top part (103) having overlap surfaces (109, 111) at each end for connecting to a metal foil (105);
    providing a metal foil (105) with two lateral sidewalls (115, 117) having overlap surfaces (119, 121); and
    attaching the metal foil (105) and the top part (103) to each other in such a way that the overlap surfaces (109, 111) at each end of the top part (103) and the overlap surfaces (119, 121) of the lateral sidewalls (115, 117) of the metal foil (105) are overlapping, and mutually fastening the overlap surfaces (111, 119, 109, 121) by spot welding or gluing from an outer side of the overlap surfaces (111, 119, 109, 121), wherein an end of an overlap surface (111, 119, 109, 121) overlapping another overlap surface is present at the outer surface on each side of the spacer (101).

7. A insulating glass unit comprising a first glass pane (201), a second glass pane (203), and a spacer (101) as claimed in claim 1.

* * * * *